United States Patent
Tsunashima et al.

[19]

[11] Patent Number: 5,991,082
[45] Date of Patent: Nov. 23, 1999

[54] LENS SYSTEM WITH MULTIPLE FOCAL LINES

[75] Inventors: Teruyoshi Tsunashima, Tokyo; Tamio Hara, Nagoya; Kozo Ando, Tokyo, all of Japan

[73] Assignees: Nikon Corporation, Tokyo; Toyota School Foundation, Nagoya; Institute of Physical and Chemical Research, Saitama, all of Japan

[21] Appl. No.: 08/802,953

[22] Filed: Feb. 21, 1997

[30] Foreign Application Priority Data

Feb. 22, 1996 [JP] Japan .................................. 8-035289
Nov. 6, 1996 [JP] Japan .................................. 8-311467

[51] Int. Cl.⁶ .......................... G02B 27/10; G02B 27/12
[52] U.S. Cl. ........................ 359/618; 359/629; 359/640
[58] Field of Search .................................. 359/618, 629, 359/625, 626, 640; 356/354

[56] References Cited

U.S. PATENT DOCUMENTS 5,577,137  11/1996  Groger et al. ............................ 385/12
5,726,804  3/1998  Hait .......................................... 359/577
5,734,504  3/1998  Billman ................................... 359/618

*Primary Examiner*—Georgia Epps
*Assistant Examiner*—Ricky Mack
*Attorney, Agent, or Firm*—Klarquist Sparkman Campbell Leigh & Whinston, LLP

[57] ABSTRACT

Lens systems are disclosed having multiple focal lines and that are operable to form multiple narrow superimposable focal lines. The focal lines typically have linewidths of ≦ approximately 10 μm, formed from an incident light flux from a laser. The superimposed focal lines can have sufficient energy density to serve as a pumping-laser source for an X-ray laser. The lens systems comprise, axially from the incident light side, a wave-surface splitter and a focusing system. The wave-surface splitter splits the wave surface of the incident light into subfluxes. The focusing system focuses the subfluxes into respective linear focal lines that can be superimposed to form a combined focal line having very high energy density. The wave-surface splitter is preferably a prism having multiple facets with respective prism angles; the focusing system preferably comprises multiple cylindrical lenses each having a generation line perpendicular to the ridge lines separating the facets of the prism.

20 Claims, 4 Drawing Sheets

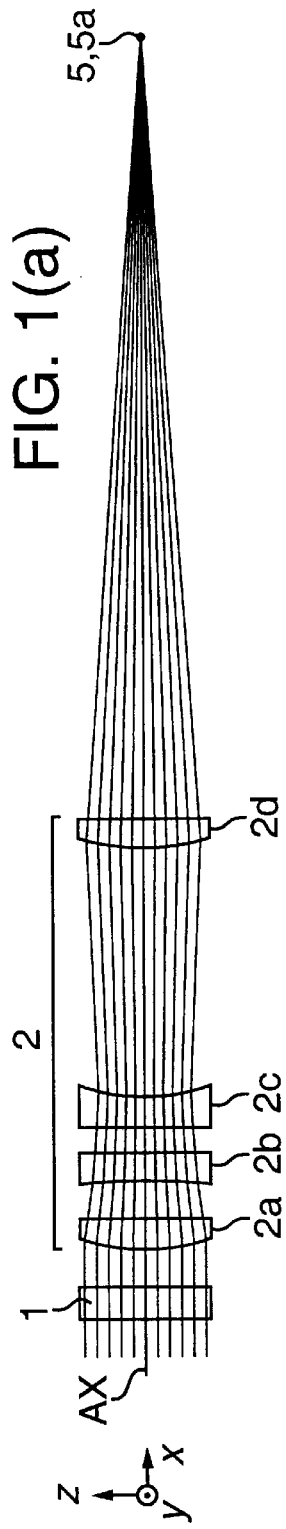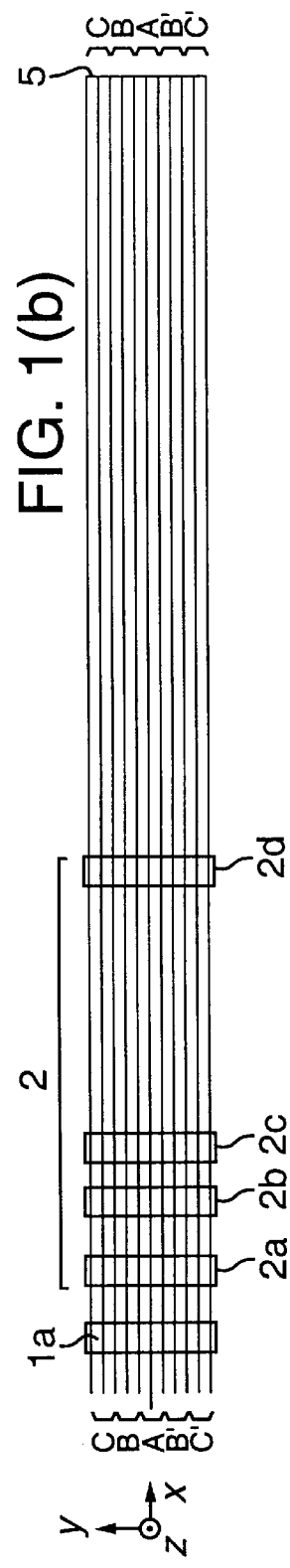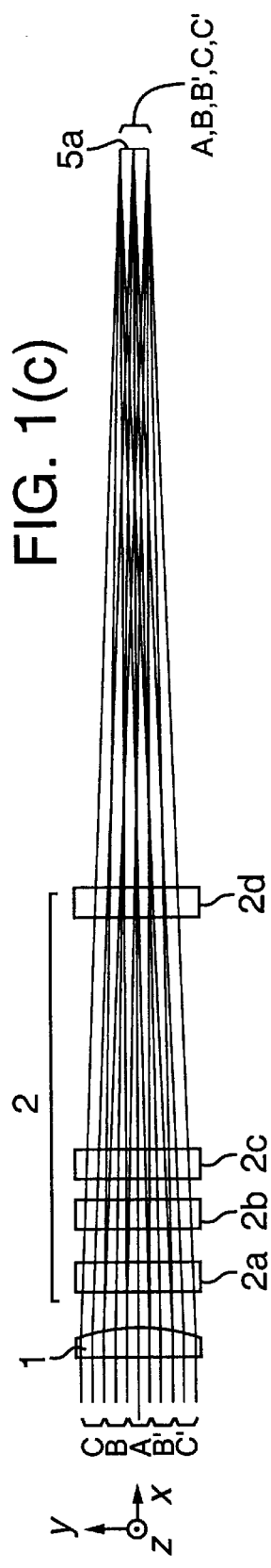

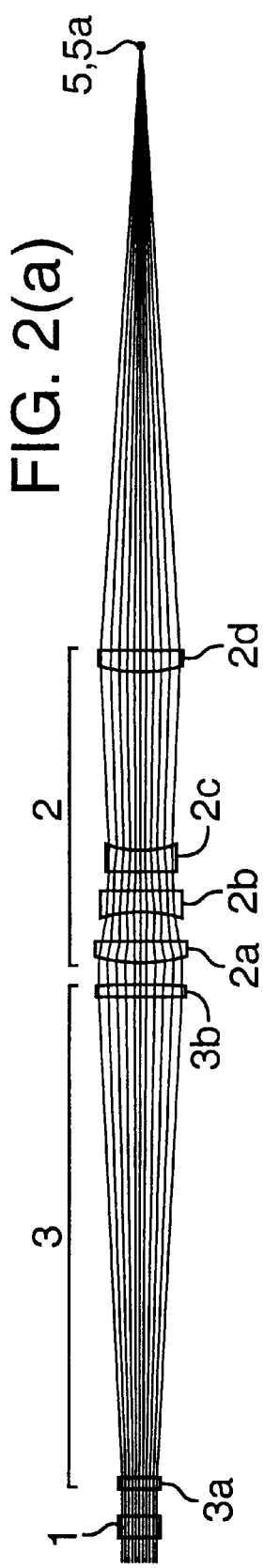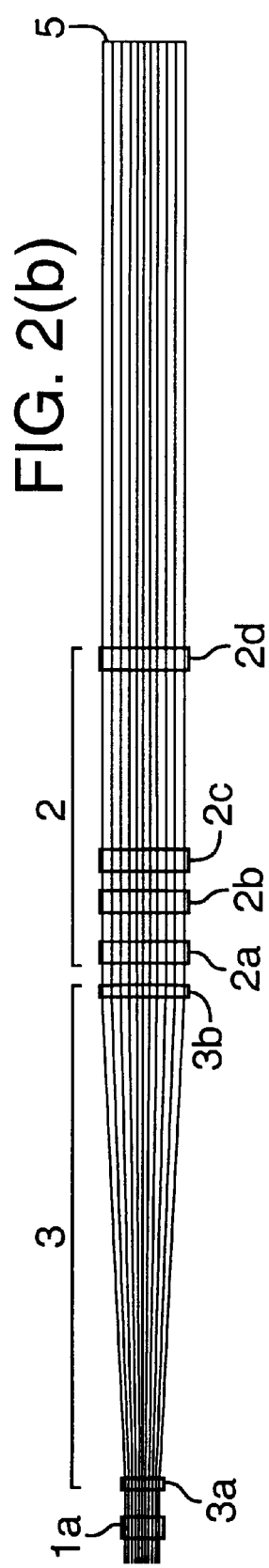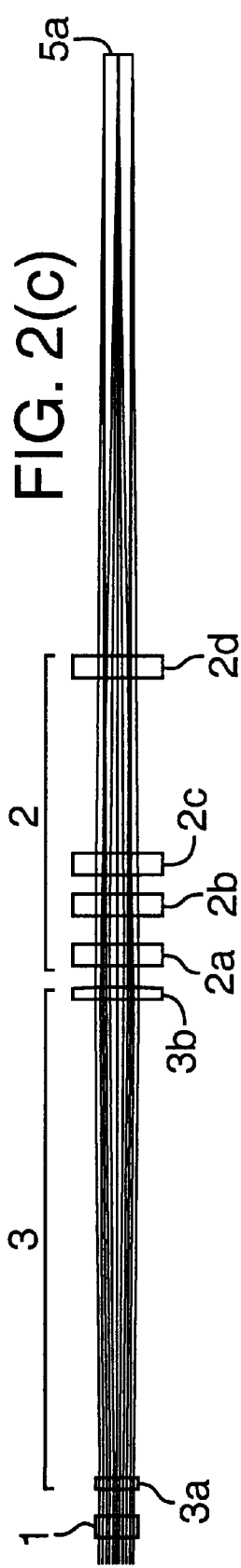

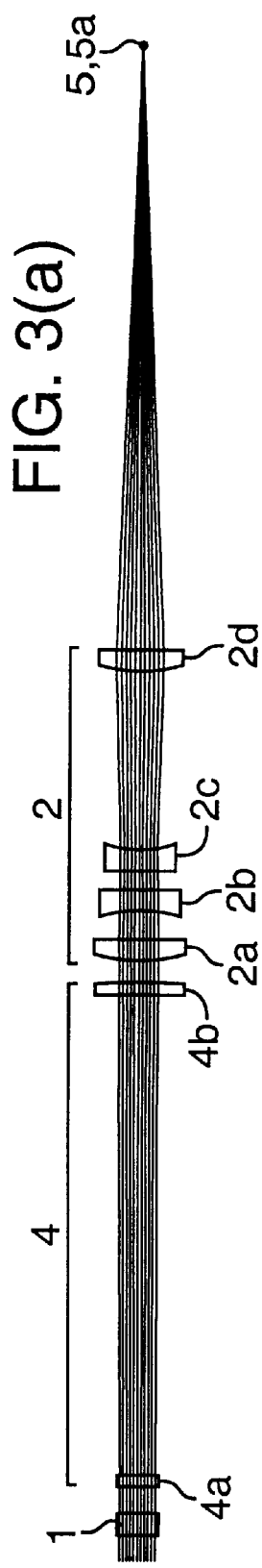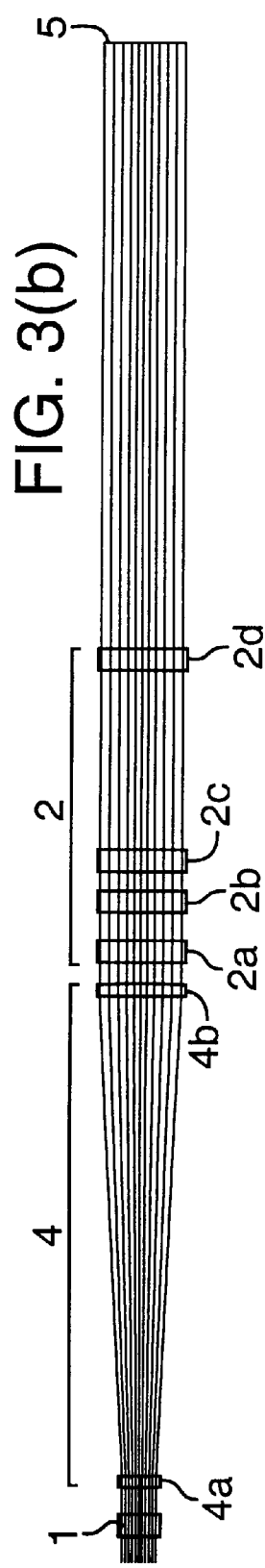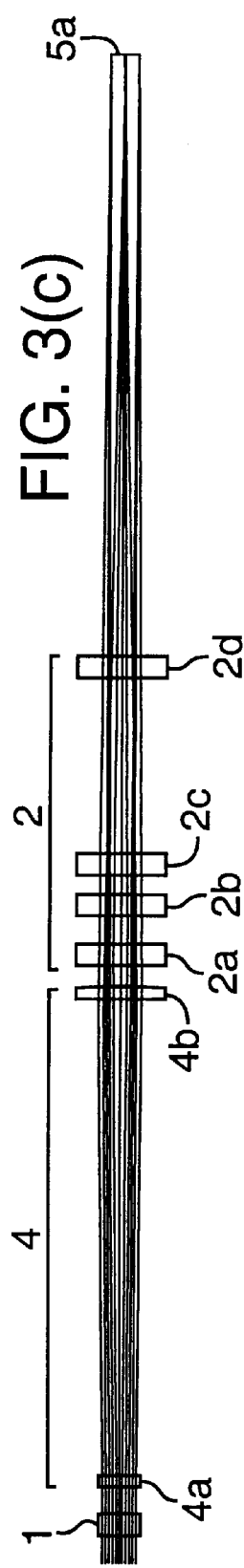

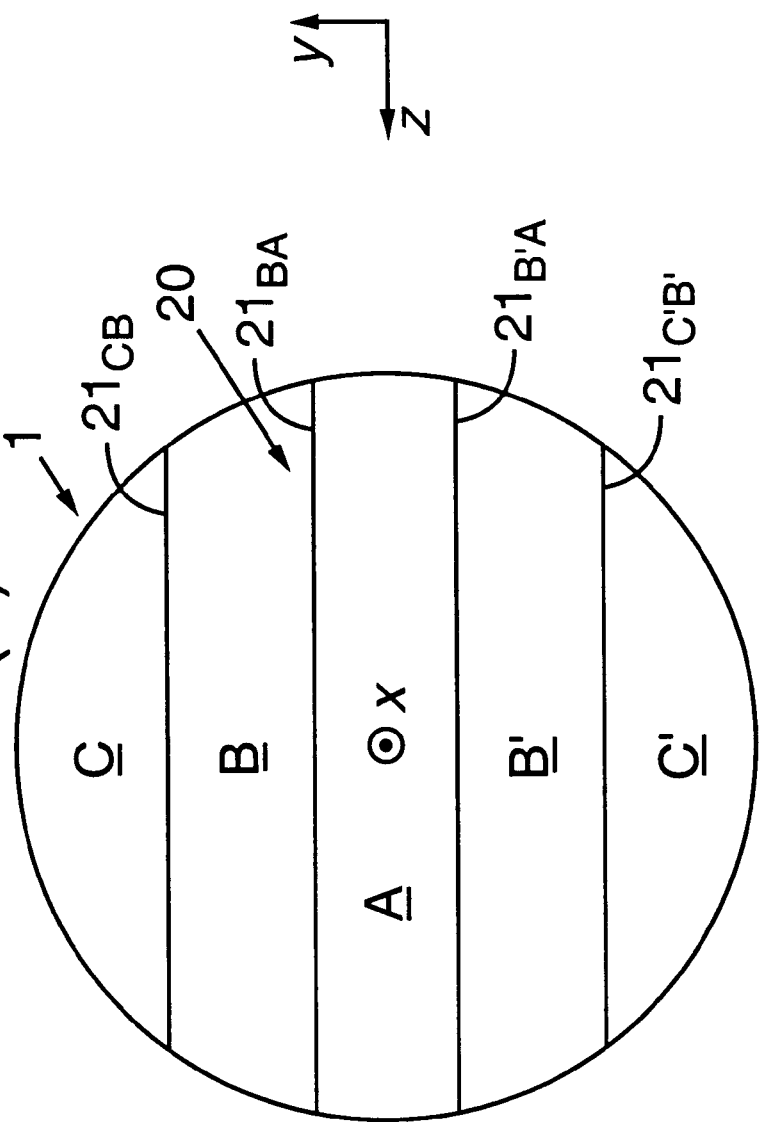
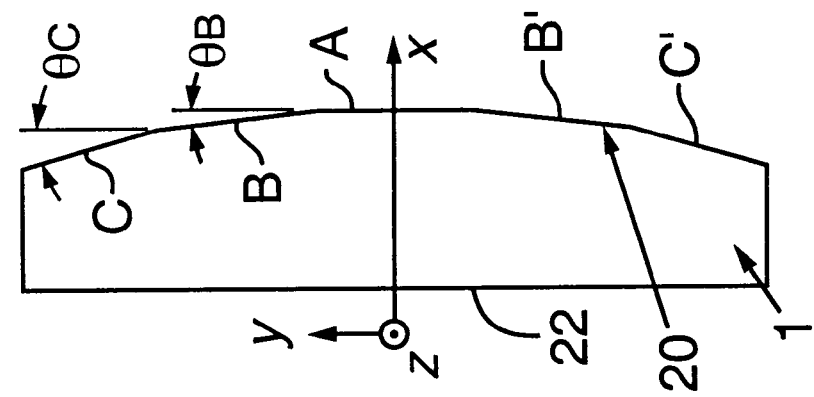

LENS SYSTEM WITH MULTIPLE FOCAL LINES

FIELD OF THE INVENTION

This invention pertains to lenses having multiple focal lines that are operable to focus laser light into multiple superimposable focal lines that serve to concentrate the light energy to a high-intensity level usable as a pumping energy source in an X-ray laser.

BACKGROUND OF THE INVENTION

In a typical X-ray laser, the laser medium undergoes a suitable population inversion when light from a pumping laser is focused into one or more high-intensity focusing lines that are incident on a suitable target comprising the X-ray gain medium. Achieving a population inversion in the X-ray gain medium requires an input of highly intense energy in order to achieve the required ionizations in the gain medium. Several techniques are known for increasing the intensity of light from the pumping laser incident on the target to a sufficiently high level. One way is to focus the pumping-laser light as multiple focal lines on the target. The focal lines, each having a narrow width, are superimposed on the target. To such end, a lens with multiple focal lines can be used.

Conventional multiple-focal-line lenses have been manufactured at Quebec University in Canada and at the Shanghai Optical Precision Machine Research Institute in China. These lenses reportedly have been used in X-ray lasers. The lenses are configured as multiple cylindrical or convex lenses arranged vertically into several optical elements each capable of producing a line of pumping-laser light on the target. Exploiting a prism effect, the pumping laser light beam passes through each of the optical elements to "fire" simultaneously across all the focal lines. Such lenses can be cemented or non-cemented.

Unfortunately, splitting a cylindrical lens or a concave lens vertically or using a cemented configuration to form multiple focal lines does not ease the difficulty of making the width of the multiple focal lines sufficiently narrow to achieve the requisite high density of pumping radiation. That is, when a parallel pumping laser beam is directed into such a lens, the multiple-focal-line width cannot be made less than about 10 $\mu$m; in fact, the line width is usually about 100 $\mu$m or more. In the case of X-ray laser gain media that generate polyvalent ions when pumped, the wider the focal lines, the greater the required energy of each line (i.e., energy level is proportional to the line width). The minimum energy level required simply cannot be practicably reached with devices requiring a miniaturized X-ray source or X-ray laser. Furthermore, it has heretofore not be feasible to combine multiple split optical elements so as to produce multiple, narrow focal lines of pumping radiation with a high degree of accuracy.

SUMMARY OF THE INVENTION

This invention cures the shortcomings of the prior art summarized above by providing multiple-focal line lens systems operable to produce sufficiently narrow focal line widths for X-ray laser use. Such lens systems can produce focal lines having a width of 10 $\mu$m or less.

More specifically, a multiple-focal-line lens system according to the invention comprises, in order from the incident-laser side, a wave-surface splitter operable to receive a parallel light flux from an upstream pumping laser and to split the wave surface of the laser light flux into multiple light subfluxes, and a cylindrical-lens focusing system operable to receive the multiple light subfluxes from the wave-surface splitter and to focus the subfluxes into a focal line.

According to a preferred embodiment, the wave-surface splitter comprises a prism with multiple longitudinally arranged facets bounded by parallel ridge lines. (For ease of description, and not intending to be limiting, the wave-surface splitter is referred to generally herein as a "prism.") Each facet of the prism corresponds to a separate light subflux. The cylindrical-lens focusing system comprises a group of cylindrical lens components each having a cylindrical surface defined from a separate generating line. The generating lines of the cylindrical lens components are parallel to each other, and are each oriented in a direction perpendicular to the orientation direction of the ridge lines of the prism. The generating lines and the ridge lines are perpendicular to the optical axis of the multiple-focal-line lens system.

The multiple-focal-line lens system can also comprise an angle-magnification converter situated axially between the prism and the cylindrical lens group. The angle-magnification converter preferably comprises a spherical afocal expander comprising, in order from the laser side, a negative lens element and a positive lens element. Alternatively, the angle-magnification converter can comprise a negative and a positive cylindrical lens having parallel generating lines that are parallel to each other and to the ridge lines of the prism.

The foregoing and additional features and advantages of the present invention will be more readily apparent from the following detailed description, which proceeds with reference to the accompanying drawings.

BRIEF DESCRIPTION OF THE DRAWINGS

FIG. 1(a) is a horizontal cross section of the first example embodiment of a lens with multiple focal lines according to the invention.

FIG. 1(b) is a reference vertical cross section of an embodiment similar to the first example embodiment except that a parallel plate is used instead of the wave-surface splitter (prism).

FIG. 1(c) is a vertical cross section of the first example embodiment.

FIG. 2(a) is a horizontal cross section of the third example embodiment.

FIG. 2(b) is a reference vertical cross section of an embodiment similar to the third example embodiment except that a parallel plate is used instead of the prism.

FIG. 2(c) is a vertical cross section of the third example embodiment.

FIG. 3(a) is a horizontal cross section of the fourth example embodiment.

FIG. 3(b) is a reference vertical cross section of an embodiment similar to the fourth example embodiment except that a parallel plate is used instead of the prism.

FIG. 3(c) is a vertical cross section of the fourth example embodiment.

FIG. 4(a) is an enlarged schematic vertical cross section of the wave-surface splitter 1 (prism) used in the first example embodiment.

FIG. 4(b) is a right side view of the prism 1 used in the first example embodiment.

DETAILED DESCRIPTION

A first preferred embodiment of a multiple-focal-line lens system according to the invention is depicted in FIGS. 1(a)–1(c). The embodiment of FIGS. 1(a)–1(c) comprises a wave-surface splitter 1 (referred to generally as a "prism" as mentioned above) and a cylindrical focusing system 2 all arranged on an optical axis AX.

The prism 1 is operable to split the wave surface of an incident parallel light flux, such as a pumping-laser light flux, propagating from a source (such as a laser, not shown) situated upstream (to the left of the prism 1), into multiple subfluxes. To such end, the prism 1 is preferably comprises multiple longitudinally arranged facets bounded by parallel ridge lines. Each facet corresponds to a separate light subflux produced by the prism 1. The rays in each particular subflux are parallel to each other; but, the rays in one subflux are not parallel to the rays in any other subflux.

The cylindrical-lens focusing system 2 has overall positive refractive power and preferably comprises multiple cylindrical lenses arranged on the optical axis AX. Each lens has a cylindrical surface defined from a separate generating line. The generating lines of the cylindrical lenses are parallel to each other and are oriented in a direction perpendicular to the optical axis AX and to the ridge lines of the prism 1.

In FIG. 1, the optical axis AX extends in the +X direction, and the Y and Z dimensions define a plane oriented perpendicularly to the optical axis. FIG. 1(a) shows the X-Z section of the multiple-focal-line lens system, and FIG. 1(c) shows the X-Y section. The X-Z section shown in FIG. 1(a) is termed the horizontal cross section and the X-Y section shown in FIG. 1(c) is termed the vertical cross section. FIG. 1(b) is a reference X-Y section comprising a parallel plate 1a instead of the prism 1. FIG. 1(b) is provided to increase an understanding of the operation of the multiple-focal-line lens system shown in FIGS. 1(a) and 1(c).

Table 1, below, provides specifications for the multiple-focal-line lens system of this first embodiment. In the "System Data" section of the table, $f_2$ represents the focal length of the cylindrical-lens focusing system 2 and λ represents the pumping laser wavelength used. In the "Lens Data" section of the table, the first (left-most) column provides a list of lens-surface numbers for each of the lenses of the cylindrical-lens focusing system 2 starting from the laser side (left side). The second column denoted "$r_Z$" pertains to the horizontal cross section of the radial curvature of each of the cylindrical lenses. The middle column denoted "$r_Y$" pertains to the vertical cross section of the radial curvature of each of the cylindrical lenses. The fourth column denoted "d" pertains to the axial distance between respective adjacent cylindrical lens surfaces. The right-most column denoted "n" pertains to the refractive index of each of the cylindrical lenses. Unless otherwise noted, the unit of length is millimeters.

As suggested in Table 1 and shown in FIGS. 4(a)–4(b), the surface 20 of the prism 1 in this embodiment defines five planar zones, C, B, A, B' and C' (the surface 20 is oriented downstream, and the opposing surface 22 is oriented upstream toward the pumping laser source). The zones are bounded by ridge lines $21_{CB}$, $21_{BA}$, $21_{B'A}$, and $21_{C'B'}$ that extend in the z dimension. As indicated in the "Prism Data and Focal Lines" section of Table 1, each zone has equal width extending in the z dimension. The "y" dimension (in mm) is the width of each facet of the prism. As indicated in FIG. 1(a), a horizontal cross section of the prism 1 appears as a parallel plate. As indicated in FIGS. 1(c) and 4(a), a vertical cross section of the prism 1 has a polygonal profile with facets defined by the zones C, B, A, B', C' and prism angles $\theta_A$, $\theta_C$, $\theta_B$, $\theta_{B'}$, $\theta_{C'}$.

With respect to the prism angles shown in FIG. 4(a), the following apply:

$|\theta_A|=0°$ $|\theta_B|=|\theta_{B'}|$ $|\theta_C|=|\theta_{C'}|$ $|\theta_A|<|\theta_B|<|\theta_C|$ Note that the polarity of the prism angles $\theta_{B'}$ and $\theta_{C'}$ is opposite the polarity of the prism angles $\theta_B$ and $\theta_C$, respectively.

The cylindrical-lens focusing system 2 in this embodiment preferably comprises four cylindrical lenses 2a, 2b, 2c, 2d. As can be readily appreciated from FIGS. 1(a) and 1(c), the generating line of each cylindrical lens is oriented parallel to the y direction. For this reason, the horizontal cross sections of the cylindrical lenses appear to have the radial curvatures shown in FIG. 1(a), but the vertical cross sections of the cylindrical lenses appear as parallel plates in FIGS. 1(b) and 1(c).

With respect to FIG. 1(a), a laser-light flux propagating from a laser light source (not shown, but situated to the left of the figure on the optical axis AX) is incident on the prism 1 as a parallel light flux. Upon passing through the cylindrical-lens focusing system 2, the laser light flux appears to be focused to a single point 5a (the point actually represents a focusing line viewed from its end).

The prism 1 splits the incident light flux from the laser into multiple subfluxes that, when viewed in the Z direction as in FIG. 1(c), converge somewhat toward the optical axis. As a result, the focal line 5a is shorter than the width, in the Y dimension, of the prism 1. If a parallel plate 1a were used instead of the prism 1, as shown in FIG. 1(b), the rays of the light flux as viewed in the Z direction would remain parallel after passing through the cylindrical lens focusing system 2 and would not converge toward the optical axis. For this reason, if the parallel plate 1a were to be used instead of the prism 1, focusing of the laser light flux by the cylindrical-lens focusing system 2 would yield a focal line 5 (FIG. 1(b)) that is considerably longer than the focal line 5a shown in FIG. 1(c). Thus, the light energy per unit area of the focal line 5(a) in FIG. 1(c) is greater than the light energy per unit area of the focal line 5 in FIG. 1(b).

As shown in FIG. 1(c), since the prism angle $\theta_A$ is 0°, the rays of the light subflux exiting zone A are parallel to each other and to the optical axis AX. As viewed in the Z dimension (FIG. 1(c)), the subflux from zone A then passes through the cylindrical-lens focusing system 2 as parallel rays that are focused to form the focal line 5a. Thus, the length of the focal line 5a in the Y dimension (FIG. 1(c)) is the same as the width of the zone A (which in FIG. 1(c) is ⅕ the full width of the prism 1 in the Y dimension and thus ⅕ of the width of the laser light flux in the Y dimension).

The incident light flux entering the other zones B, B', C, and C' of the prism 1 exhibits upon exiting the prism a stepwise progressively greater amount of refraction with increasing distance from the center of the prism 1. As shown in FIG. 1(c), the incident light flux is refracted by the zones B, B', C, and C' as respective subfluxes toward the optical axis AX and focused at the focusing line 5a. As viewed in FIG. 1(c), the rays of each subflux are parallel, but the rays of one subflux are not parallel to the rays of any other subflux. Because of the refractive ability of the prism 1 shown in FIG. 1(c), the rays of all the subfluxes converge to form a focusing line 5a that is shorter than the focusing line 5 of FIG. 1(b).

The prism angles $\theta_{C'}$, $\theta_{B'}$, $\theta_B$, $\theta_C$ of the non-central zones C', B', B, C, respectively, are set so that the individual focal lines from each of the zones A, B, B', C, and C' are effectively superimposed at the focusing line 5a. That is, each subflux converges to the same focusing line 5a.

According to the foregoing, the intensity of the laser light flux entering the prism 1 is distributed evenly among the zones A, B, B', C, C'. Because each subflux is superimposed on all other subfluxes at the focusing line 5a, the intensity of the laser light per unit area in the focusing line 5a is greatly increased relative to the intensity of the flux incident on the prism 1.

As viewed in FIG. 1(c), the light subfluxes exiting the zones B, B', C, and C' do not propagate parallel to the optical axis AX. As a result, the point of image formation for light subfluxes exiting the non-central zones B, B', C, C' is very slightly more in the negative direction (i.e., slightly toward the cylindrical-lens focusing system 2) than the point of image formation of the light flux exiting the central zone A (Table 1). Also, the focal lines that are formed from these light subfluxes exhibit a slight deviation from perpendicularity relative to the X axis.

As a result, the best location on the optical axis for the focal line 5a (comprising superimposed focused subfluxes from each of the zones A, B, B', C, and C') is situated slightly in the negative direction relative to the location of the focal line formed from light flux exiting only zone A. Also, the focal line 5a, even when located most optimally on the optical axis to yield the best "focus," is wider than the individual focal line produced by the subflux exiting zone A.

In the "Prism Data and Focal Lines" section of Table 1, below, the focal points of the subfluxes exiting zones B, B', C, and C', and the focal point of the combined subfluxes from all five zones are indicated as being slightly defocused (negatively) relative to the focal point of zone A. The stated focal-line widths of subfluxes from each of zones B, B', C, and C' correspond to the respective focal-line width at the best focal point for each subflux. Similarly, the stated width of the multiple (i.e., all five superimposed) focal lines corresponds to the focal-line width at the best focal point of the combined subfluxes.

As can be ascertained from Table 1, whereas the focal-line widths for individual subfluxes are sufficiently narrow, the more a zone is laterally displaced from the central zone A, the more displaced the best focal point, for a subflux passing through the zone, in the negative direction. For this reason, the focal-line width of the combined focal line (for all five subfluxes superimposed) is greater than the focal line for the A-zone subflux. Nevertheless, the combined focal line 5a is substantially narrower than obtainable according to the prior art.

In order to make the width of each subflux focal line sufficiently narrow, it is necessary to obtain a high degree of spherical-aberration correction on the axis of the cylindrical-lens focusing system 2. Technology for providing excellent correction of spherical aberration and thus providing excellent convergence of rays at a single point is well developed for optical systems employing spherical lens components. In spherical-lens systems, the actual focusing configuration or the number of lenses needed to achieve such correction of spherical aberration will differ depending upon the necessary image brightness (i.e., F/number of the system).

With respect to the cylindrical-lens focusing system 2 of this embodiment, the problem of providing good correction of spherical aberration can be addressed by analyzing an analogous focusing system employing spherical (rather than cylindrical) lens components to provide a "focus" at the same axial distance for the same incident light flux as the cylindrical-lens focusing system.

As stated above, the focal line 5 in FIG. 1(b), when a parallel plate 1a is used instead of the prism 1, has a length equal to the width of the light flux incident on the parallel plate 1a. The width of the focal line 5 is equal to the transverse spherical aberration that would be exhibited by the equivalent spherical lens system. These focal lines are symmetrical where the y-direction shape and intensity distribution are y=0.

The length of the combined focal line 5a (formed by each subflux) is determined by the diameter (width) of the incident laser light, the number of facets on the prism 1, and the prism angles. In this embodiment, the number of facets is five, but there are no particular restrictions regarding the number of facets.

TABLE 1

| System Data | |
|---|---|
| Incident light flux width: | 60 mm |
| Total length: | 634.48 mm |
| $f_2$: | 430.2 mm |
| $\lambda$: | 1.064 $\mu$m |

Lens Data

| Surface No. | $r_Z$ (mm) | $r_Y$ (mm) | d (mm) | n |
|---|---|---|---|---|
| 1 | ∞ | ∞ | 15.00000 | 1.449675 |
| 2 | ∞ | (Prism Angle) | 20.00000 | |
| 3 | 99.00000 | ∞ | 15.00000 | 1.506672 |
| 4 | ∞ | ∞ | 20.80000 | |
| 5 | −230.00000 | ∞ | 15.00000 | 1.506672 |
| 6 | ∞ | ∞ | 13.00000 | |
| 7 | ∞ | ∞ | 15.00000 | 1.506672 |
| 8 | 80.10000 | ∞ | 125.00000 | |
| 9 | 124.00000 | ∞ | 14.00000 | 1.506672 |
| 10 | ∞ | ∞ | 381.68000 | |

Prism Data and Focal Lines

| Zone | y (mm) | Prism Angle | Focal Point (mm) | Focal Line Width |
|---|---|---|---|---|
| C | 12 | 5.055° | −0.88 | 1.5 $\mu$m |
| B | 12 | 2.545° | −0.21 | 6.1 $\mu$m |
| A | 12 | 0° | (381.68) | 6 $\mu$m |
| B' | 12 | 2.545° | −0.21 | 6.1 $\mu$m |
| C' | 12 | 5.055° | −0.88 | 1.5 $\mu$m |
| Multiple Focal Lines | | | −0.38 | 60 $\mu$m |

Increasing the precision with which the focal lines from individual subfluxes are superimposed on the combined focal line 5a yields further increases in laser light intensity at the focal line 5a. To accomplish this, the best focal point in the X direction of the focal line from each of the subfluxes from the non-central zones B, B', C, and C' should be moved even closer to the best focal point of the subflux from the central zone A. Also, the inclination (i.e., deviation from perpendicularity relative to the X axis) of the focal lines generated from subfluxes from the non-central zones should be reduced.

The amount of defocus and inclination of the focal lines generated from the subfluxes passing through the non-central zones B, B', C, and C' increase in relation to the exit angle from the vertical cross section of the cylindrical-lens focusing system 2. The exit angle from the vertical cross section of the cylindrical-lens focusing system 2 is equal to the entrance angle into the vertical cross section of the cylindrical-lens focusing system 2, so it follows that the exit angle is equal to the exit angle from the vertical cross section of the prism 1.

In order to reduce the amount of defocus and the inclination of the focal lines generated from the subfluxes exiting the non-central zones B, B', C, and C' while maintaining accurate superimposition of these focal lines with the focal line generated from the subflux exiting the central zone A, it is necessary to reduce the exit angle of the subfluxes from the non-central zones of the prism 1. However, simply reducing the exit angles will not allow one to superimpose each of the focal lines in the y direction. That is, one way of reducing the exit angle of the subfluxes exiting the non-central zones B, B', C, and C' while simultaneously positioning the centers of the focal lines of these subfluxes on the X axis (FIG. 1(*a*)), is to provide a sufficient axial distance between the prism 1 and the cylindrical-lens focusing system 2.

The second example embodiment incorporates the foregoing considerations. Data for the second example embodiment are set forth in Table 2, and the general configuration is as shown in FIGS. 1(*a*) and 1(*c*). In the second example embodiment, the prism 1 is situated a distance from the cylindrical-lens focusing system 2 sufficient to impart a sufficient reduction of the prism angles. As shown in Table 2, the amount of defocus of the individual focal lines produced from the subfluxes propagating from the non-central zones B, B', C, and C' is zero; hence, the amount of defocus of the best focal point for the combined focal line is also zero. This allows the width of the combined focal line to be extremely narrow.

TABLE 2

| System Data | |
|---|---|
| Incident light flux width: | 60 mm |
| Total length: | 4404.48 mm |
| $f_2$: | 430.2 mm |
| λ: | 1.064 μm |

| Lens Data | | | | |
|---|---|---|---|---|
| Surface No. | $r_Z$ (mm) | $r_Y$ (mm) | d (mm) | n |
| 1 | ∞ | ∞ | 15.00000 | 1.449675 |
| 2 | ∞ | (Prism Angle) | 3770.00000 | |
| 3 | 99.00000 | ∞ | 15.00000 | 1.506672 |
| 4 | ∞ | ∞ | 20.80000 | |
| 5 | −230.00000 | ∞ | 15.00000 | 1.506672 |
| 6 | ∞ | ∞ | 13.00000 | |
| 7 | ∞ | ∞ | 15.00000 | 1.506672 |
| 8 | 80.10000 | ∞ | 125.00000 | |
| 9 | 124.00000 | ∞ | 14.00000 | 1.506672 |
| 10 | ∞ | ∞ | 381.68000 | |

| Prism Data and Focal Lines | | | | |
|---|---|---|---|---|
| Zone | y (mm) | Prism Angle | Focal Point (mm) | Focal Line Width |
| C | 12 | −0.70° | 0 | 8 μm |
| B | 12 | −0.35° | 0 | 7 μm |
| A | 12 | 0° | (381.68) | 7 μm |
| B' | 12 | 0.35° | 0 | 7 μm |
| C' | 12 | 0.70° | 0 | 8 μm |
| Multiple Focal Lines | | | 0 | 8 μm |

In the second example embodiment, and based on the data in Table 2, it is clear that sufficiently narrow focal lines can be obtained. However, since there is a large axial distance between the prism 1 and the cylindrical-lens focusing system 2, this embodiment requires that the optical system be quite large. With this embodiment, it can be difficult to configure the system such that the prism angles are sufficiently shallow.

A third example embodiment is shown in FIGS. 2(*a*)–2(*c*), and the specifications are set forth in Table 3. In this embodiment, a spherical afocal expander 3 is employed. The afocal expander 3 is axially situated between the prism 1 and the cylindrical-lens focusing system 2. The afocal expander 3 in this embodiment comprises spherical lens components, including (in order from the prism side) a negative lens 3*a* and a positive lens 3*b*.

If the height (relative to the optical axis) of the incident light flux into the afocal expander 3 is denoted h, the angle formed by any inclined ray of the incident flux with the optical axis AX is denoted u, the height (relative to the optical axis) of the exit light flux is denoted h', and the angle formed by any inclined ray of the exit flux with the optical axis AX is denoted u', then the afocal magnification β and the angle magnification γ are defined as follows:

$$\beta = h'/h$$

$$\gamma = u'/u$$

The relationship between β and γ is:

$$\gamma = 1/\gamma$$

If, in this example embodiment, the afocal magnification β is 2.4×, then the angle magnification γ is 1/2.4×. Hence, even if the total length of the system is reduced to ¼, a sufficiently fine combined focal line can be obtained. Also, here the prism angles are increased 6.5× relative to the second example embodiment. Such larger prism angles simplify the manufacture of the prism 1 (because prisms with larger angles are generally easier to finish to high accuracy than prisms with shallow angles). This also eases the necessity to form the prism angles with extremely high accuracy.

Furthermore, by correcting any spherical aberration contributed by the negative and positive lenses of the afocal expander 3 with this embodiment, the focal-line width can be even better corrected.

TABLE 3

| System Data | |
|---|---|
| Incident light-flux width: | 25 mm |
| Total length: | 1044.04 mm |
| γ: | 1/2.4 |
| $f_2$: | 455.9 mm |
| λ: | 1.064 μm |

| Lens Data | | | | |
|---|---|---|---|---|
| Surface No. | $r_Z$ (mm) | $r_Y$ (mm) | d (mm) | n |
| 1 | ∞ | ∞ | 15.00000 | 1.449675 |
| 2 | ∞ | (Prism Angle) | 20.00000 | |
| 3 | −139.70500 | −139.70500 | 8.00000 | 1.449675 |
| 4 | 629.60000 | 629.60000 | 340.00000 | |
| 5 | ∞ | ∞ | 8.00000 | 1.506672 |
| 6 | −307.85200 | −307.85200 | 15.00000 | |
| 7 | 105.39000 | ∞ | 15.00000 | 1.506672 |
| 8 | ∞ | ∞ | 20.80000 | |
| 9 | −223.65000 | ∞ | 15.00000 | 1.506672 |
| 10 | ∞ | ∞ | 13.00000 | |
| 11 | ∞ | ∞ | 15.00000 | 1.506672 |
| 12 | 89.00000 | ∞ | 125.00000 | |
| 13 | 130.82100 | ∞ | 14.00000 | 1.506672 |

TABLE 3-continued

| 14 | ∞ | ∞ | 420.24 |

Prism Data and Focal Lines

| Zone | y (mm) | Prism Angle | Focal Point (mm) | Focal Line Width |
|------|--------|-------------|------------------|------------------|
| C | 5 | −4.565° | 0 | 3.6 μm |
| B | 5 | −2.282° | 0 | 4.5 μm |
| A | 5 | 0° | (420.24) | 4.5 μm |
| B' | 5 | 2.282° | 0 | 4.5 μm |
| C' | 5 | 4.565° | 0 | 3.6 μm |
| Multiple Focal Lines | | | 0 | 4.5 μm |

In order to reduce the angles of the light subfluxes entering the cylindrical-lens focusing system 2 for the third example embodiment, the afocal expander 3 is situated in front of the cylindrical-lens focusing system 2. However, since the afocal expander 3 is a spherical system in this example embodiment, the diameter of the light flux entering the cylindrical-lens focusing system 2 (when viewed in horizontal section (see FIG. 2(a)) is increased.

A fourth example embodiment is shown in FIGS. 3(a)–3(c) and the specifications are set forth in Table 4. In the fourth example embodiment, as viewed in the vertical section (FIG. 3(a)), the angle of the light flux entering the cylindrical-lens focusing system 2 is reduced compared to the third example embodiment. This results in a narrower width of light flux entering the cylindrical-lens focusing system 2 (FIG. 3(a)). To achieve this result, a cylindrical afocal expander 4 is situated between the prism 1 and the cylindrical-lens focusing system 2. The cylindrical afocal expander 4 comprises (from the splitter side) a cylindrical negative lens 4a and a cylindrical positive lens 4b. The generating lines for both cylindrical lenses 4a, 4b of the afocal expander 4 are parallel to the ridge lines of the prism 1 and so are perpendicular to any of the generating lines of the lenses 2a–2d of the cylindrical-lens focusing system 2.

Thus, use of the cylindrical afocal expander 4 in the fourth example embodiment leaves an angle-magnification conversion function in relation to the vertical surface. That is, the angular magnification of the cylindrical afocal expander 4 has an effect on the lengthwise direction of the split focal lines but not any effect on the horizontal cross section (i.e., the widthwise direction of the focal lines). Also, as shown in the cross section of FIG. 3(a), neither 4a nor 4b has any power and thus both function as parallel flat plates. As a result, the focal-line depth (distance along the optical axis over which the focal line width changes within an allowable amount even when defocused) can be increased even further. For example, as seen by comparing FIG. 3(a) with FIG. 2(a), the light flux in FIG. 2(a) broadens due to the spherical afocal expander 3, making the light flux focused on the focal line 5 brighter. However, in FIG. 3(a), since the light flux does not broaden due to the cylindrical afocal expander 4, the light that converges on the focal line 5 is not so bright. Thus, since the light converging on the focal line 5 is less bright in the fourth example embodiment compared to the third example embodiment, the depth of the focal line is deeper in the fourth example embodiment. Also, the width of the multiple superimposed focal lines can be further decreased.

TABLE 4

| System Data | |
|---|---|
| Incident light-flux width: | 25 mm |
| Total length: | 1044.04 mm |
| γ: | 1/2.4 |
| $f_2$: | 455.9 mm |
| λ: | 1.064 μm |

Lens Data

| Surface No. | $r_Z$ (mm) | $r_Y$ (mm) | d (mm) | n |
|---|---|---|---|---|
| 1 | ∞ | ∞ | 15.00000 | 1.449675 |
| 2 | ∞ | (Prism Angle) | 20.00000 | |
| 3 | ∞ | −139.70500 | 8.00000 | 1.449675 |
| 4 | ∞ | 629.60000 | 340.00000 | |
| 5 | ∞ | ∞ | 8.00000 | 1.506672 |
| 6 | ∞ | −307.85200 | 15.00000 | |
| 7 | 105.39000 | ∞ | 15.00000 | 1.506672 |
| 8 | ∞ | ∞ | 20.80000 | |
| 9 | −223.65000 | ∞ | 15.00000 | 1.506672 |
| 10 | ∞ | ∞ | 13.00000 | |
| 11 | ∞ | ∞ | 15.00000 | 1.506672 |
| 12 | 89.00000 | ∞ | 125.00000 | |
| 13 | 130.82100 | ∞ | 14.00000 | 1.506672 |
| 14 | ∞ | ∞ | 417.83400 | |

Prism Data and Focal Lines

| Zone | y (mm) | Prism Angle | Focal Point (mm) | Focal Line Width |
|------|--------|-------------|------------------|------------------|
| C | 5 | −4.565° | 0 | 3 μm |
| B | 5 | −2.282° | 0 | 3.1 μm |
| A | 5 | 0° | (417.834) | 4.5 μm |
| B' | 5 | 2.282° | 0 | 3.1 μm |
| C' | 5 | 4.565° | 0 | 3 μm |
| Multiple Focal Lines | | | 0 | 4.5 μm |

From the foregoing, it is understood that the present invention provides multiple-focal-line optical systems in which multiple focal lines having sufficiently fine line width can be obtained. For example, a pumping laser light used for an oscillating X-ray laser can be easily focused into a linear light flux.

Whereas the invention has been described in connection with multiple example embodiments, it will be understood that the invention is not limited to those embodiments. On the contrary, the invention is intended to encompass all modifications, alternatives, and equivalents as may be included within the spirit and scope of the invention as defined by the appended claims.

What is claimed is:

1. A multiple-focal-line lens system, comprising in order on an optical axis from an incident-light side to an image side:

(a) a wave-surface splitter operable to receive an incident parallel light flux and to split the incident light flux into multiple subfluxes each having parallel rays, the wave-surface splitter comprising a prism with multiple longitudinally arranged facets bounded by parallel ridge lines, each facet corresponding to a separate light subflux produced by the wave-surface splitter; and (b) a focusing system operable to receive the subfluxes and focus them into at least one individual but superimposed linear focal line.

2. An X-ray laser, comprising the lens system of claim 1 used to direct a pumping laser light flux onto a target comprising an X-ray laser gain medium.

3. The lens system of claim 1, wherein: the parallel ridge lines bounding the multiple longitudinally arranged facets extend in a direction perpendicular to the optical axis; and the focusing system comprises a group of cylindrical lens components each having a cylindrical surface defined from a generating line, the generating lines of the lens components being parallel to each other and oriented in a direction perpendicular to the orientation direction of the ridge lines of the prism and to the optical axis.

4. The lens system of claim 3, further comprising an angle-magnification converter situated on the optical axis between the prism and the focusing system.

5. The lens system of claim 4, wherein the angle-magnification converter comprises an afocal expander comprising a spherical lens system comprising, in order from the light-source side, a negative spherical lens component and a positive spherical lens component.

6. The lens system of claim 4, wherein the angle-magnification converter comprises an afocal expander comprising a cylindrical lens system comprising, in order from the light-source side, a negative cylindrical lens component and a positive cylindrical lens component.

7. The lens system of claim 6, wherein each of the first and second cylindrical lens components of the afocal expander has a generating line that is parallel to the ridge-line direction of the wave-surface splitter and perpendicular to the generating-line direction of the focusing system.

8. The lens system of claim 1, wherein
the focusing system comprises, in order from the incident light side, a first positive cylindrical lens, a first negative cylindrical lens, a second negative cylindrical lens, and a second positive cylindrical lens, each cylindrical lens having a generating line that is perpendicular to the ridge lines of the prism.

9. The lens system of claim 8, further comprising an angle-magnification converter situated on the optical axis between the prism and the focusing system.

10. The lens system of claim 9, wherein the angle-magnification converter comprises an afocal expander comprising a spherical lens system comprising, in order from the light-source side, a negative spherical lens component and a positive spherical lens component.

11. The lens system of claim 9, wherein the angle-magnification converter comprises an afocal expander comprising a cylindrical lens system comprising, in order from the light-source side, a negative cylindrical lens component and a positive cylindrical lens component.

12. The lens system of claim 11, wherein each of the first and second cylindrical lens components of the afocal expander has a generating line that is parallel to the ridge-line direction of the wave-surface splitter and perpendicular to the generating-line direction of the focusing system.

13. A multiple-focal-line lens system, comprising in order on an optical axis from an incident-light side to an image side:

(a) a wave-surface splitter operable to receive an incident parallel light flux and to split the incident light flux into multiple subfluxes, the wave-surface splitter comprising a prism with multiple longitudinally arranged facets bounded by parallel ridge lines, each facet corresponding to a separate light subflux produced by the wave-surface splitter; and (b) a focusing system operable to receive the subfluxes and focus them into at least one individual but superimposed linear focal line.

14. An X-ray laser, comprising the lens system of claim 13 used to direct a pumping laser light flux onto a target comprising an X-ray laser gain medium.

15. A multiple-focal-line lens system, comprising in order on an optical axis from an incident-light side to an image side:

(a) a wave-surface splitter operable to receive an incident parallel light flux and to split the incident light flux into multiple subfluxes each having parallel rays, the wave-surface splitter comprising a prism with multiple longitudinally arranged facets bounded by parallel ridge lines extending in a direction perpendicular to the optical axis, each facet corresponding to a separate light subflux produced by the wave-surface splitter; and (b) a focusing system operable to receive the subfluxes and focus them into individual but superimposed linear focal lines.

16. The lens system of claim 15, further comprising an angle-magnification converter situated on the optical axis between the prism and the focusing system.

17. The lens system of claim 15, wherein the focusing system comprises, in order from the incident light side, a first positive cylindrical lens, a first negative cylindrical lens, a second negative cylindrical lens, and a second positive cylindrical lens, each cylindrical lens having a generating line that is perpendicular to the ridge lines of the prism.

18. A method for illuminating a target with multiple focal lines, comprising:

(a) receiving an incident parallel light flux;

(b) directing the incident light flux to a wave-surface splitter situated on an optical axis, the wave-surface splitter comprising a prism with multiple longitudinally arranged facets bounded by parallel ridge lines extending in a direction perpendicular to the optical axis;

(c) splitting the incident light flux into multiple light subfluxes using the wave-surface splitter, each of the multiple light subfluxes having parallel rays; and (d) receiving the light subfluxes and focusing the light subfluxes into individual but superimposed linear focal lines at a target.

19. The method of claim 18, wherein the light subfluxes propagate at angles with respect to each other, the method further comprising the step of magnifying the angles before directing the light subfluxes to the target.

20. The method of claim 18, wherein the step of focusing the light subfluxes comprises directing the light subfluxes sequentially through a first positive cylindrical lens, a first negative cylindrical lens, a second negative cylindrical lens, and a second positive cylindrical lens, each cylindrical lens having a generating line that is perpendicular to the ridge lines of the prism.

* * * * *

UNITED STATES PATENT AND TRADEMARK OFFICE
CERTIFICATE OF CORRECTION

PATENT NO. : 5,991,082
DATED : November 23, 1999
INVENTOR(S) : Tsunashima, Teruyoshi, Hara, Tamio and Ando, Kozo It is certified that error appears in the above-identified patent and that said Letters Patent is hereby corrected as shown below:

Column 4,
Line 13, "angles $\theta_B$, and $\theta_C$," should read -- angles $\theta_{B'}$ and $\theta_{C'}$ --.

Column 6,
Line 44, "5.055°" should read -- -5.055° --.
Line 45, "2.545°" should read -- -2.545° --.

Column 8,
Line 27, "$\gamma = 1/\gamma$" should read -- $\gamma = 1/\beta$ --.

Column 10,
Line 5, "1044.04 mm" should read -- 1041.63 mm --.

Signed and Sealed this

Twenty-seventh Day of November, 2001

Attest:

Nicholas P. Godici

NICHOLAS P. GODICI
*Attesting Officer*  *Acting Director of the United States Patent and Trademark Office*